(12) United States Patent
Holt

(10) Patent No.: US 10,856,617 B2
(45) Date of Patent: Dec. 8, 2020

(54) EXPANDABLE SUPPORT MEMBER FOR AN ARTICLE OF FOOTWEAR

(71) Applicant: NIKE, Inc., Beaverton, OR (US)

(72) Inventor: Scott C. Holt, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 16/271,698

(22) Filed: Feb. 8, 2019

(65) Prior Publication Data

US 2019/0166951 A1 Jun. 6, 2019

Related U.S. Application Data

(63) Continuation of application No. 15/180,280, filed on Jun. 13, 2016, now Pat. No. 10,238,178.

(Continued)

(51) Int. Cl.
*A43B 23/02* (2006.01)
*A43B 1/04* (2006.01)
*A43B 3/26* (2006.01)
*B32B 5/02* (2006.01)
*B32B 5/04* (2006.01)
*B32B 3/26* (2006.01)
*A43B 7/08* (2006.01)
*A43B 23/00* (2006.01)

(52) U.S. Cl.
CPC .............. *A43B 23/027* (2013.01); *A43B 1/04* (2013.01); *A43B 3/26* (2013.01); *A43B 23/0235* (2013.01); *A43B 23/0275* (2013.01); *A43B 7/085* (2013.01); *A43B 23/00* (2013.01); *B32B 3/266* (2013.01); *B32B 5/026* (2013.01); *B32B 5/04* (2013.01); *B32B 2437/02* (2013.01); *Y10T 428/24* (2015.01); *Y10T 428/24298* (2015.01); *Y10T 428/24306* (2015.01); *Y10T 428/24314* (2015.01); *Y10T 428/24322* (2015.01); *Y10T 428/24331* (2015.01); *Y10T 442/40* (2015.04)

(58) Field of Classification Search
CPC ......... A43B 1/0009; A43B 1/04; A43B 7/085; A43B 23/027; A43B 23/0235; A43B 3/26
See application file for complete search history.

(56) References Cited

U.S. PATENT DOCUMENTS 1,617,430 A  2/1927  Curt
1,647,914 A  11/1927  Hess
(Continued)

FOREIGN PATENT DOCUMENTS

AU  2008202224 A1  6/2008
CN  201341485 Y  11/2009
(Continued)

OTHER PUBLICATIONS

International Search Report and Written Opinion, dated Sep. 16, 2016, from PCT Application No. PCT/US2016/037609, 15 pages.

*Primary Examiner* — Ted Kavanaugh
(74) *Attorney, Agent, or Firm* — Klarquist Sparkman, LLP

(57) ABSTRACT

An expandable support member for an article of footwear includes a plurality of expansion components that are joined together. The support member can be expandable between a contracted position and an expanded position. The plurality of expansion components are configured to expand along a non-linear path when the support member moves between the contracted position and the expanded position.

16 Claims, 11 Drawing Sheets

Related U.S. Application Data

(60) Provisional application No. 62/181,015, filed on Jun. 17, 2015.

(56) References Cited

U.S. PATENT DOCUMENTS

| | | | |
|---|---|---|---|
| 1,695,225 A | 12/1928 | Bohr | |
| 1,712,634 A | 5/1929 | Emerson | |
| 1,730,768 A | 10/1929 | Heyman | |
| 1,737,748 A | 12/1929 | Reginald | |
| 1,751,962 A | 3/1930 | James | |
| D82,079 S | 9/1930 | Daniels | |
| 1,879,144 A | 9/1932 | Emery | |
| 2,069,381 A | 2/1937 | Morgan | |
| 2,188,168 A | 1/1940 | Mabel | |
| 2,633,440 A | 3/1953 | Scholl | |
| 3,063,058 A | 11/1962 | George | |
| D213,462 S | 3/1969 | Casorati | |
| 3,655,501 A | 4/1972 | Tesch | |
| 3,733,860 A | 5/1973 | Engelhard | |
| 3,819,033 A | 6/1974 | Hueber | |
| 3,985,599 A | 10/1976 | Lepoutre et al. | |
| 4,265,032 A | 5/1981 | Levine | |
| 4,271,640 A | 6/1981 | Gadbois et al. | |
| 4,294,240 A | 10/1981 | Thill | |
| 4,306,675 A | 12/1981 | Swanson | |
| 4,386,990 A | 6/1983 | Gluckin | |
| D293,966 S | 2/1988 | Baungratz | |
| D293,968 S | 2/1988 | Baungratz | |
| 4,791,685 A | 12/1988 | Maibauer | |
| D299,783 S | 2/1989 | Brown et al. | |
| 4,813,158 A | 3/1989 | Brown | |
| 5,038,718 A | 8/1991 | Pfleger | |
| 5,154,485 A | 10/1992 | Fleishman | |
| D347,519 S | 6/1994 | Worthington | |
| D347,938 S | 6/1994 | Smith | |
| 5,430,959 A | 7/1995 | Mitsui | |
| 5,461,884 A | 10/1995 | McCartney et al. | |
| 5,667,135 A | 9/1997 | Schaefer | |
| 5,804,021 A | 9/1998 | Abuto et al. | |
| 5,932,056 A | 8/1999 | Mark et al. | |
| 5,967,788 A | 10/1999 | Udoh | |
| D415,882 S | 11/1999 | McDowell | |
| D428,245 S | 7/2000 | Brown | |
| 6,108,943 A | 8/2000 | Hudson et al. | |
| D431,352 S | 10/2000 | Hlavacs | |
| 6,170,175 B1 | 1/2001 | Funk | |
| 6,401,364 B1 | 6/2002 | Burt | |
| D499,243 S | 12/2004 | Avar | |
| 6,862,820 B2 | 3/2005 | Farys et al. | |
| D511,614 S | 11/2005 | Gerber | |
| 6,990,755 B2* | 1/2006 | Hatfield | A43B 13/16 36/97 |
| 7,155,846 B2 | 1/2007 | Alfaro et al. | |
| D578,294 S | 10/2008 | Mervar et al. | |
| D579,186 S | 10/2008 | Mervar et al. | |
| D636,584 S | 4/2011 | Williams, Jr. | |
| D636,587 S | 4/2011 | Williams, Jr. | |
| D636,593 S | 4/2011 | Henrichot | |
| D636,594 S | 4/2011 | Henrichot | |
| D649,771 S | 12/2011 | Lee | |
| D693,104 S | 11/2013 | McMillan | |
| D707,436 S | 6/2014 | Seamarks | |
| 9,888,743 B2* | 2/2018 | Bell | A43B 3/04 |
| 10,098,409 B1* | 10/2018 | Cross | A43B 13/188 |
| 10,264,851 B2* | 4/2019 | Waatti | B29C 64/112 |
| 10,638,810 B1* | 5/2020 | Cheney | A43B 11/00 |
| 2004/0084460 A1 | 5/2004 | Scheetz et al. | |
| 2004/0209042 A1 | 10/2004 | Peacock | |
| 2005/0076536 A1 | 4/2005 | Hatfield et al. | |
| 2005/0115284 A1 | 6/2005 | Dua | |
| 2005/0158513 A1 | 7/2005 | Peacock et al. | |
| 2006/0283042 A1 | 12/2006 | Greene et al. | |
| 2007/0122590 A1 | 5/2007 | Lalvani | |
| 2007/0180730 A1* | 8/2007 | Greene | A43B 23/0295 36/3 A |
| 2007/0271821 A1 | 11/2007 | Meschter | |
| 2007/0271822 A1 | 11/2007 | Meschter | |
| 2007/0271823 A1 | 11/2007 | Meschter | |
| 2008/0110048 A1 | 5/2008 | Dua et al. | |
| 2008/0250668 A1 | 10/2008 | Marvin et al. | |
| 2010/0154256 A1 | 6/2010 | Dua | |
| 2010/0325918 A1 | 12/2010 | Johnson | |
| 2011/0197475 A1 | 8/2011 | Weidl et al. | |
| 2011/0302810 A1 | 12/2011 | Borel et al. | |
| 2012/0011744 A1 | 1/2012 | Bell et al. | |
| 2012/0023786 A1 | 2/2012 | Dojan | |
| 2012/0030965 A1 | 2/2012 | Greene et al. | |
| 2012/0255201 A1 | 10/2012 | Little | |
| 2013/0019500 A1 | 1/2013 | Greene | |
| 2013/0025157 A1 | 1/2013 | Wan et al. | |
| 2013/0055590 A1 | 3/2013 | Mokos | |
| 2013/0219747 A1 | 8/2013 | Lederer | |
| 2013/0326914 A1 | 12/2013 | Lopez | |
| 2014/0059734 A1 | 3/2014 | Toronjo | |
| 2014/0059896 A1 | 3/2014 | Weidl et al. | |
| 2014/0101816 A1* | 4/2014 | Toronjo | A42B 1/08 2/69 |
| 2014/0109286 A1* | 4/2014 | Blakely | A42B 1/22 2/69 |
| 2014/0115923 A1 | 5/2014 | Meythaler et al. | |
| 2014/0157623 A1 | 6/2014 | Dekovic | |
| 2014/0237858 A1 | 8/2014 | Adami et al. | |
| 2014/0259760 A1 | 9/2014 | Dojan et al. | |
| 2014/0377488 A1 | 12/2014 | Jamison | |
| 2015/0089836 A1 | 4/2015 | Smaldone et al. | |
| 2020/0008526 A1* | 1/2020 | Luedecke | A43B 23/0205 |

FOREIGN PATENT DOCUMENTS

| | | |
|---|---|---|
| FR | 614343 | 12/1926 |
| FR | 2 720 910 | 12/1995 |
| JP | H0271704 | 3/1990 |
| JP | 06038608 | 5/1994 |
| JP | 2011017110 | 1/2011 |
| WO | WO 98/0053980 | 12/1998 |
| WO | WO 03/041525 | 5/2003 |
| WO | WO 2013/019934 | 2/2013 |

\* cited by examiner

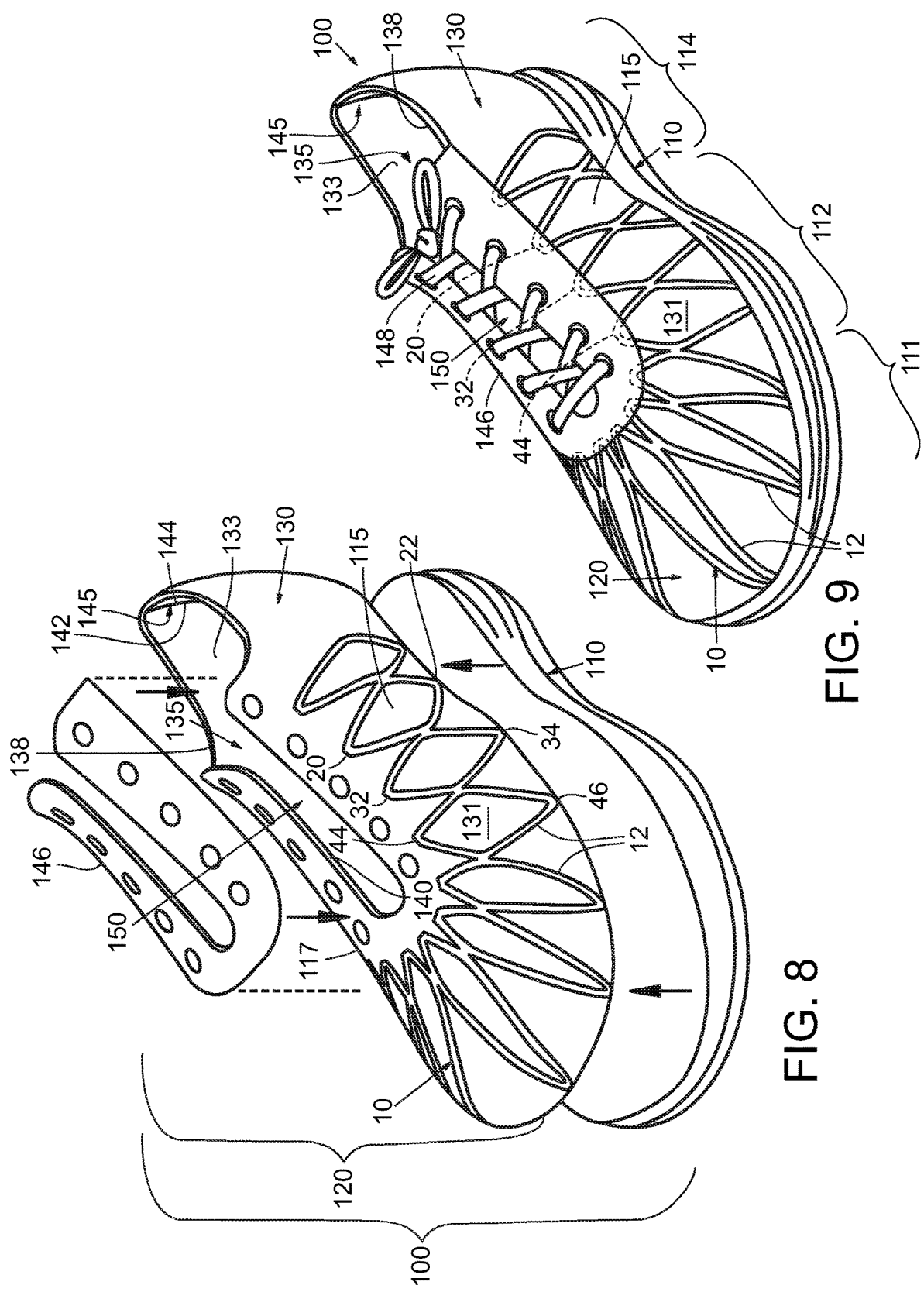

EXPANDABLE SUPPORT MEMBER FOR AN ARTICLE OF FOOTWEAR

CROSS REFERENCE TO RELATED APPLICATIONS

This application is a continuation of U.S. patent application Ser. No. 15/180,280, filed Jun. 13, 2016, which claims the benefit of U.S. Provisional Patent Application No. 62/181,015, filed Jun. 17, 2015. The prior applications are incorporated by reference herein in their entirety.

BACKGROUND

Conventional articles of footwear generally include two primary elements: an upper and a sole structure. The upper is secured to the sole structure and forms a void within the footwear for comfortably and securely receiving a foot. The sole structure is secured to a lower surface of the upper so as to be positioned between the upper and the ground. In some articles of athletic footwear, for example, the sole structure may include a midsole and an outsole. The midsole may be formed from a polymer foam material that attenuates ground reaction forces to lessen stresses upon the foot and leg during walking, running, and other ambulatory activities. The outsole is secured to a lower surface of the midsole and forms a ground-engaging portion of the sole structure that is formed from a durable and wear-resistant material. The sole structure may also include a sockliner positioned within the void and proximal a lower surface of the foot to enhance footwear comfort.

The upper generally extends over the instep and toe areas of the foot, along the medial and lateral sides of the foot, and around the heel area of the foot. In some articles of footwear, such as basketball footwear and boots, the upper may extend upward and around the ankle to provide support or protection for the ankle. Access to the void on the interior of the upper is generally provided by an ankle opening in a heel region of the footwear. A lacing system is often incorporated into the upper to adjust the fit of the upper, thereby permitting entry and removal of the foot from the void within the upper. The lacing system also permits the wearer to modify certain dimensions of the upper, particularly girth, to accommodate feet with varying dimensions. In addition, the upper may include a tongue that extends under the lacing system to enhance adjustability of the footwear, and the upper may incorporate a heel counter to limit movement of the heel.

Various materials are conventionally utilized in manufacturing the upper. The upper of athletic footwear, for example, may be formed from multiple material elements. The materials may be selected based upon various properties, including stretch-resistance, wear-resistance, flexibility, air-permeability, compressibility, and moisture-wicking, for example. With regard to an exterior of the upper, the toe area and the heel area may be formed of leather, synthetic leather, or a rubber material to impart a relatively high degree of wear-resistance. Leather, synthetic leather, and rubber materials may not exhibit the desired degree of flexibility and air-permeability for various other areas of the exterior. Accordingly, the other areas of the exterior may be formed from a synthetic textile, for example. The exterior of the upper may be formed, therefore, from numerous material elements that each imparts different properties to the upper. An intermediate or central layer of the upper may be formed from a lightweight polymer foam material that provides cushioning and enhances comfort. Similarly, an interior of the upper may be formed of a comfortable and moisture-wicking textile that removes perspiration from the area immediately surrounding the foot. The various material elements and other components may be joined with an adhesive or stitching. Accordingly, the conventional upper is formed from various material elements that each imparts different properties to various areas of the footwear.

BRIEF DESCRIPTION OF THE DRAWINGS

The present disclosure can be better understood with reference to the following drawings and description. The components in the figures are not necessarily to scale, emphasis instead being placed upon illustrating the principles of the present disclosure. Moreover, in the figures, like reference numerals designate corresponding parts throughout the different views.

FIG. 8 is an exploded perspective view of the article of footwear, wherein the support member and the substrate of FIG. 7 is shown being attached to a sole structure and a lacing element according to exemplary embodiments;

FIG. 9 is an assembled perspective view of the article of footwear of FIG. 8;

DETAILED DESCRIPTION

The embodiments described, depicted, claimed, or otherwise disclosed herein resolve one or more of the shortcomings of the prior art discussed above.

Other systems, methods, features and advantages of the present disclosure will be, or will become, apparent to one of ordinary skill in the art upon examination of the following figures and detailed description. It is intended that all such additional systems, methods, features and advantages be included within this description and this summary, be within the scope of the present disclosure, and be protected by the following claims.

Figure 10:
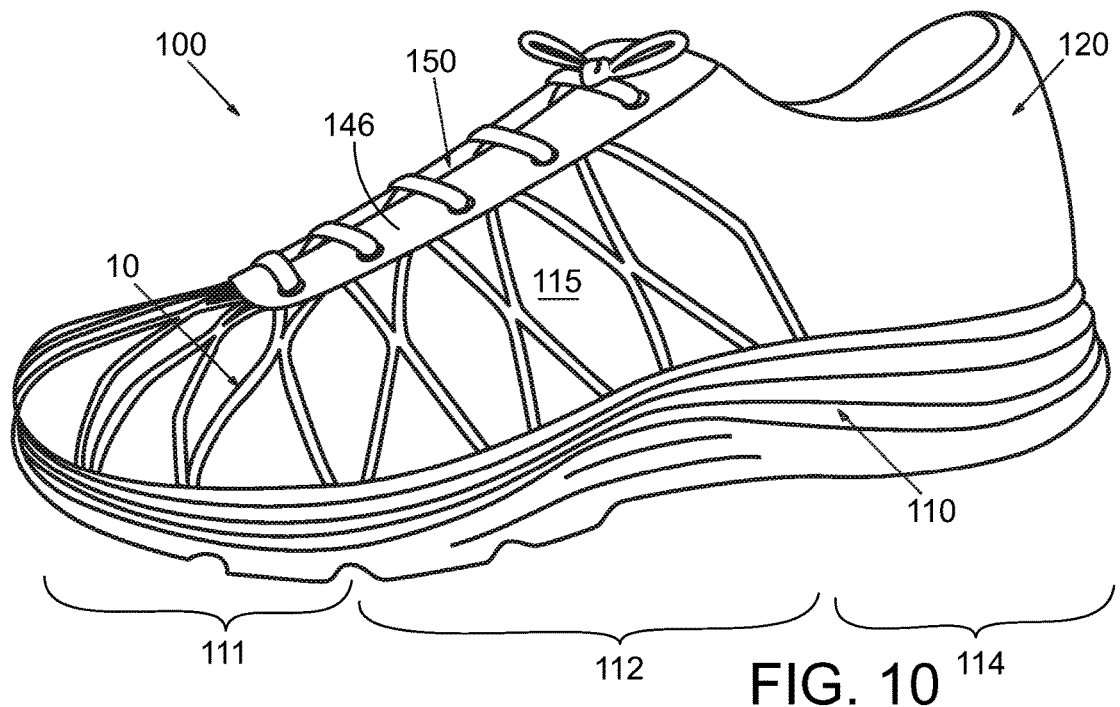
FIG. 10 is a lateral side view of the article of footwear of FIG. 9.
Figure 11:
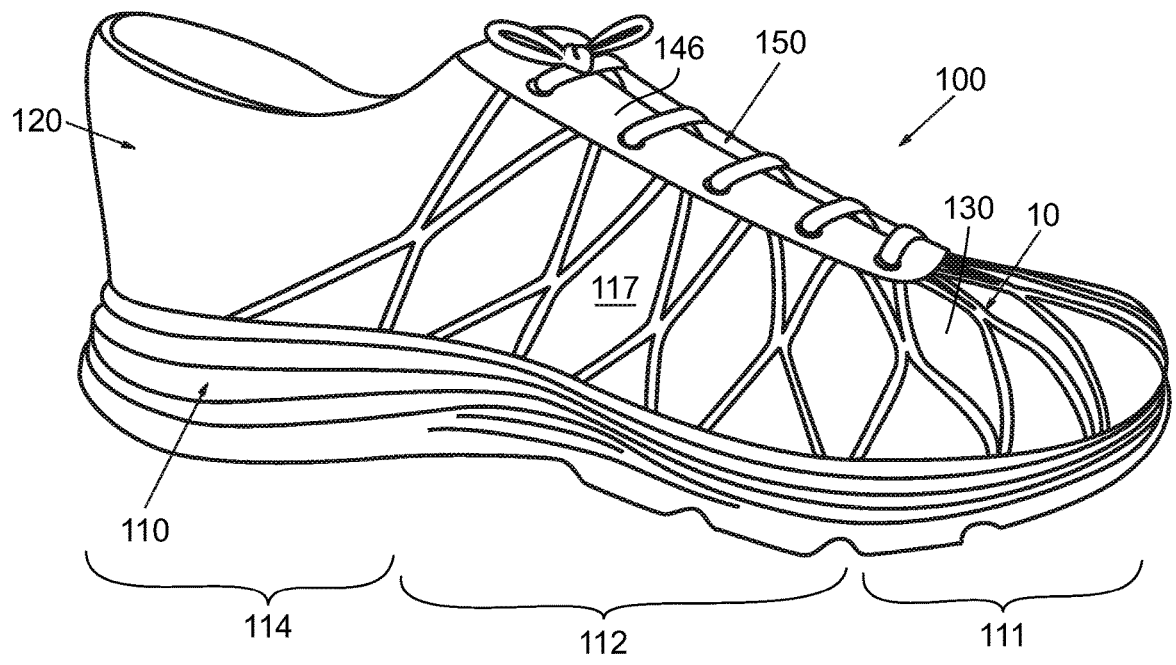
FIG. 11 is a medial side view of the article of footwear of FIG. 9.

Referring initially to FIGS. 1-11, an expandable support member 10 is illustrated according to exemplary embodiments. The support member 10 can be incorporated in an article of footwear 100 as shown in the embodiments of FIGS. 9-11. Methods of forming the expandable support member 10 and the article of footwear 100 are also indicated according to exemplary embodiments.

As will be discussed, support member 10 can form at least part of the article of footwear 100. For example, support member 10 can be incorporated in an upper 120 of footwear 100. Support member 10 can provide support to the upper 120 and/or to the wearer's foot. For example, in some embodiments, support member 10 can provide stretch resistance to upper 120. Also, in some embodiments, support member 10 can provide reinforcement to the upper 120. Support member 10 can also extend about the wearer's foot and, in some embodiments, maintain the foot substantially over a sole structure 110 of the article of footwear 100.

Figure 1:
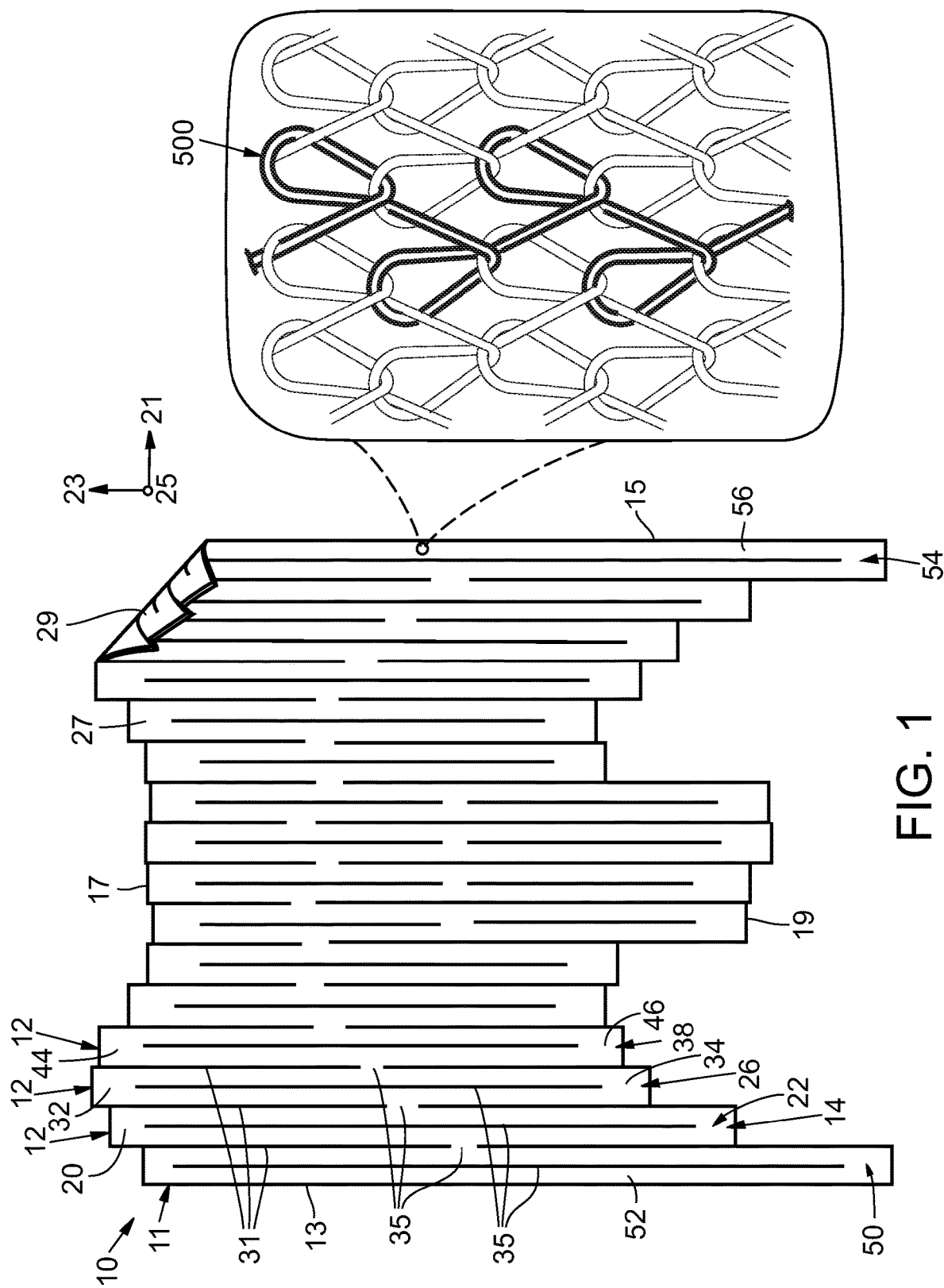
FIG. 1 is a plan view of an expandable support member for an article of footwear according to exemplary embodiments of the present disclosure.

As shown in FIG. 1, in some embodiments, expandable support member 10 can be relatively thin and substantially sheet-like. Support member 10 can include a first surface 27 and an opposite second surface 29. Also, expandable support member 10 can include an outer periphery 11.

In the embodiment of FIG. 1, outer periphery 11 can be generally subdivided into a first peripheral edge 13, a second peripheral edge 15, a third peripheral edge 17, and a fourth peripheral edge 19. First peripheral edge 13 and second peripheral edge 15 can be opposite each other. In addition, in some embodiments, third peripheral edge 17 and fourth peripheral edge 19 can be opposite each other and each can extend generally between first peripheral edge 13 and second peripheral edge 15. As will be discussed, in some embodiments, third peripheral edge 17 and/or further peripheral edge 19 can be uneven (e.g., staggered, stepped, wavy, etc.).

Support member 10 can extend and span in a width direction along a first axis 21. Also, support member 10 can extend and span in a length direction (i.e., a transverse direction) along a second axis 23. Moreover, support member 10 can have a thickness measured along a third axis 25. First, second, and third axis 25 can be orthogonal to each other. It will be appreciated that first, second, and third axes 21, 23, 25 are merely mentioned for purposes of discussion of features of support member 10.

Figure 3:
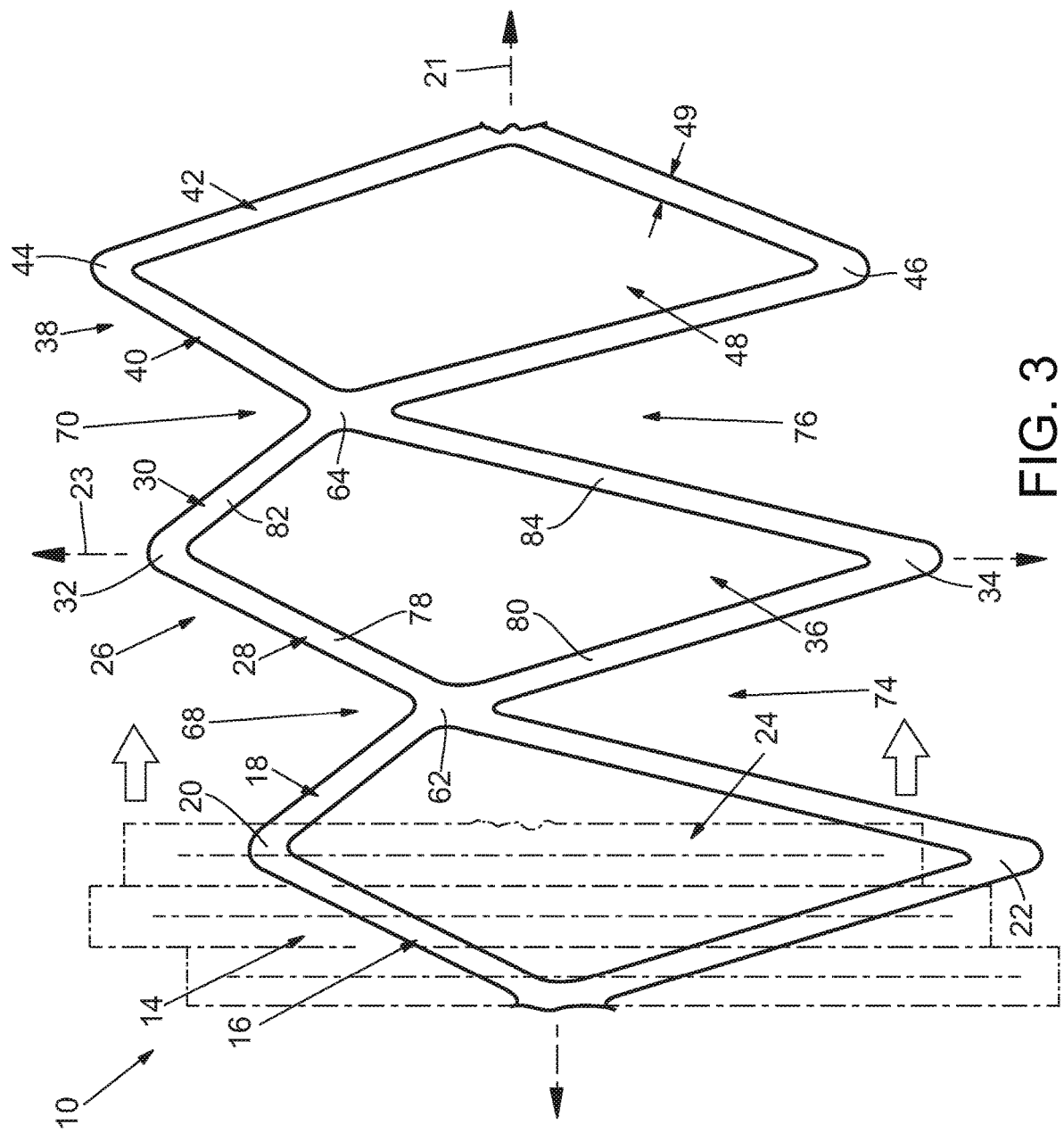
FIG. 3 is a plan view of the portion of the expandable support member of FIG. 2 shown in an expanded position, wherein the contracted position is shown in phantom.

Support member 10 can generally include a plurality of expansion components 12. The expansion components 12 can allow support member 10 to expand as represented in FIG. 3. As shown in FIG. 3, expansion components 12 can be expandable such that support member 10 can be moved between a contracted position and an expanded position. (The expanded position is shown in solid lines and the contracted position is shown in phantom according to exemplary embodiments.) In some embodiments, support member 10 can be manufactured in the contracted position. Also, in some embodiments, support member 10 can be incorporated in upper 120 when in the expanded position.

Support member 10 can also include a plurality of intermediate junctions 35 that join adjacent pairs of the expansion components 12. Moreover, support member 10 can include a plurality of external openings 31 that each extend from one of the intermediate junctions 35 to the outer periphery 11 of the support member 10. External openings 31 can partially separate apart adjacent pairs of the expansion components 12. Furthermore, support member 10 can include a plurality of internal openings 33 that are included on and extend through respective ones of the expansion components 12.

Support member 10 can exhibit a high degree of flexibility and expandability. As shown in FIG. 3, support member 10 can expand linearly along the first axis 21 in some embodiments. Stated differently, an expansion direction of support member 10 can be substantially parallel to the first axis 21 in some embodiments. Also, in some embodiments represented in FIG. 6, support member 10 can be expanded along a non-linear path (e.g., expanded about the third axis 25). Stated differently, the expansion direction of support member 10 can curve about the third axis 25 in some embodiments. Thus, as will be discussed, support member 10 can extend about a complexly curved surface of the upper 120 and/or the wearer's foot.

Expansion components 12 can have a predetermined shape and arrangement within support member 10. These features can allow support member 10 to expand along a predetermined path. Also, these features of expansion components 12 can allow support member 10 to fit to the upper 120 and/or the wearer's foot in a desirable manner. For example, in some embodiments, the shape and arrangement of expansion components 12 can allow support member 10 to lie smoothly against other portions of the upper 120 of the article of footwear 100.

Referring now to FIG. 1, support member 10 and expansion components 12 will be discussed in more detail according to exemplary embodiments. As shown in the embodiment of FIG. 1, support member 10 can include sixteen expansion components 12; however, it will be appreciated that number of expansion components 12 can vary from the illustrated embodiment without departing from the scope of the present disclosure.

Figure 2:
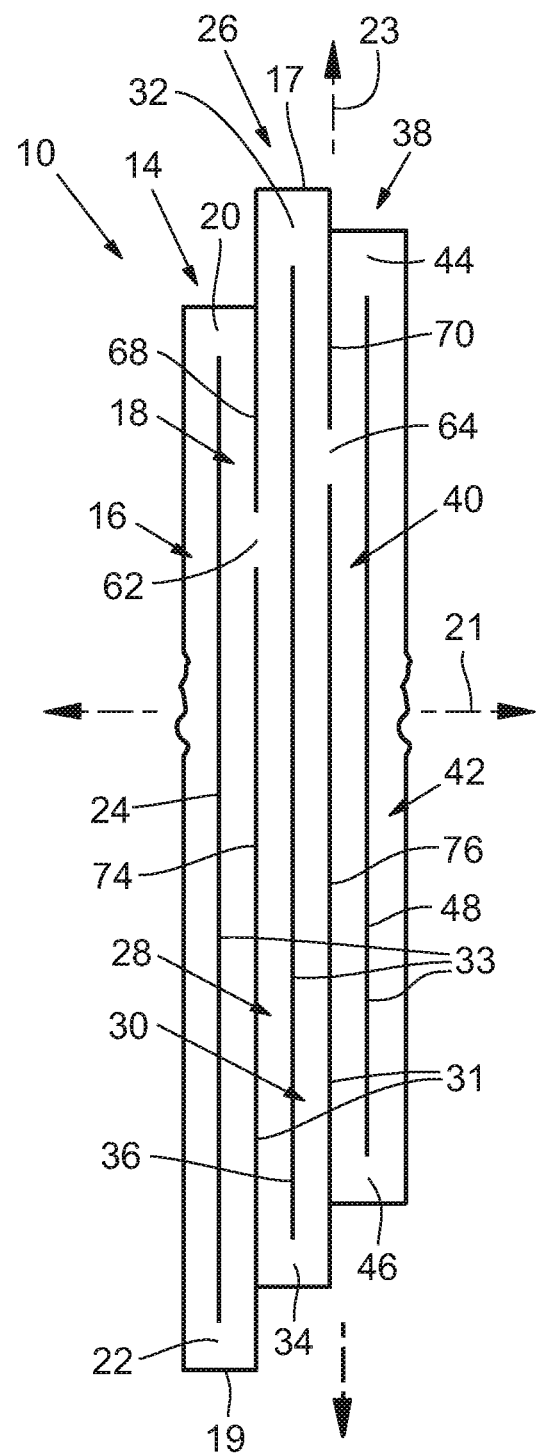
FIG. 2 is a plan view of a portion the expandable support member of FIG. 1 shown in a contracted position.
Figure 4:
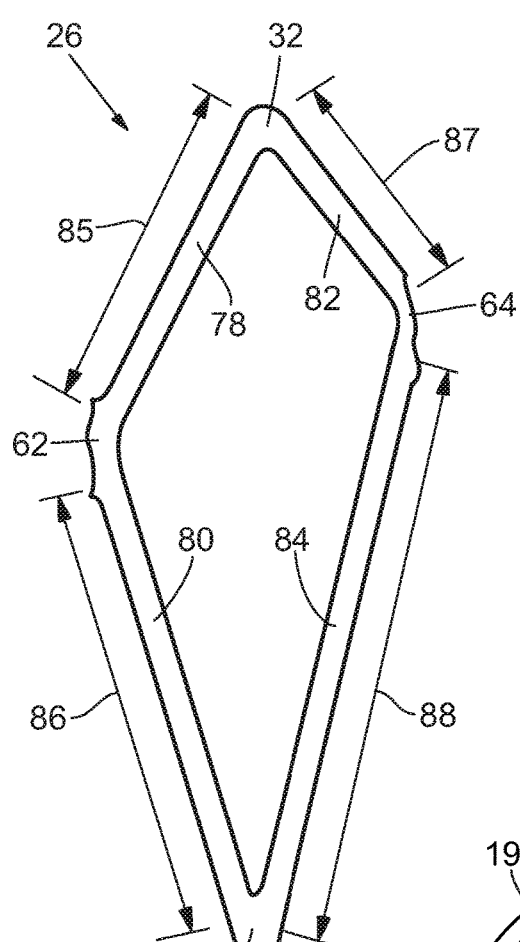
FIG. 4 is a plan view of an expansion component of the expandable support member of FIG. 1.

FIGS. 2 and 3 illustrate a portion of support member 10. Specifically, FIGS. 2 and 3 show a first expansion component 14, a second expansion component 26, and a third expansion component 38 of the support member 10 of FIG. 1. FIG. 2 illustrates these expansion components 14, 26, 38 in the contracted position, and FIG. 3 illustrates these expansion components 14, 26, 38 in the expanded position. FIG. 4 illustrates expansion component 26 independently in the expanded position.

As mentioned, support member 10 can include a plurality of internal openings 33. For example, in some embodiments, first expansion component 14 can include a first internal opening 24, which divides first expansion component 14 into a first strip member 16 and a second strip member 18. First strip member 16 and second strip member 18 can be joined at a first end junction 20 and an opposite second end junction 22. First internal opening 24 can extend between first end junction 20 and second end junction 22. As shown in FIG. 3, first strip member 17 and second strip member 18 can be elongate and relatively thin in some embodiments. For example, first strip member 17 and/or second strip member 18 can have a width 49 that is less than 0.5 inches. Also, in some embodiments, the width 49 can be less than 0.2 inches.

In some embodiments, second expansion component 26 can be substantially similar to first expansion component 14. Specifically, second expansion component 26 can include a second internal opening 36, which divides second expansion component 26 into a first strip member 28 and a second strip member 30. First strip member 28 and second strip member 30 can be joined at a first end junction 32 and an opposite second end junction 34.

Moreover, in some embodiments, third expansion component 38 can be substantially similar to first expansion component 14 and second expansion component 26. Specifically, third expansion component 38 can include a third internal opening 48, which divides third expansion component 38 into a first strip member 40 and a second strip member 42. First strip member 40 and second strip member 42 can be joined at a first end junction 44 and an opposite second end junction 46.

First, second, and third expansion components 14, 26, 38 can be arranged in a row that extends generally along the first axis 21. First, second, and third expansion components 14, 26, 38 can be attached via the plurality of intermediate junctions 35. In some embodiments, second expansion component 26 can be disposed between first expansion component 14 and third expansion component 38 within the row. Also, in some embodiments, a first intermediate junction 62 can join first strip member 28 of second expansion component 26 to second strip member 18 of first expansion component 14. Likewise, in some embodiments, a second intermediate junction 64 can join second strip member 30 of second expansion component 26 to first strip member 40 of third expansion component 38.

Additionally, as mentioned above, support member 10 can include the plurality of external openings 31 that separate adjacent pairs of the expansion components 12. For example, as shown in FIGS. 2 and 3, support member 10 can include a first external opening 68, a second external opening 70, a third external opening 74, and a fourth external opening 76. In some embodiments represented in FIG. 2, first external opening 68 can extend from first intermediate junction 62 to third peripheral edge 17. Also, second external opening 70 can extend from second intermediate junction 64 to third peripheral edge 17. First and second external openings 68, 70 can be open at third peripheral edge 17 in some embodiments. Moreover, third external opening 74 can extend from first intermediate junction 62 to fourth peripheral edge 19, and fourth external opening 76 can extend from second intermediate junction 64 to fourth peripheral edge 19. In some embodiments, third and fourth external openings 74, 76 can be open at fourth peripheral edge 19.

As shown in FIGS. 3 and 4, first strip member 28 of second expansion component 26 can be sub-divided into a first upper segment 78 and a first lower segment 80. First upper segment 78 and first lower segment 80 can be joined at first intermediate junction 62. First upper segment 78 can extend from first end junction 32 to first intermediate junction 62. First lower segment 80 can extend from first intermediate junction 62 to second end junction 34. Also, second strip member 30 can be sub-divided into a second upper segment 82 and a second lower segment 84. Second upper segment 82 and second lower segment 84 can be joined at second intermediate junction 64. Second upper segment 82 can extend from first end junction 32 to second intermediate junction 64. Second lower segment 84 can extend from second intermediate junction 64 to second end junction 34. Also, first upper segment 78 and second upper segment 82 can be joined at a first end junction 32. First lower segment 80 and second lower segment 84 can be joined at second end junction 34. It will be appreciated that first and second strip members 16, 18 of first expansion component 14 can be similarly configured. Moreover, it will be appreciated that first and second strip members 40, 42 of third expansion component 38 can be similarly configured.

As shown in FIG. 4, first upper segment 78 can have a first length 85. First length 85 can be measured from first end junction 32 to first intermediate junction 62. Similarly, first lower segment 80 can have a second length 86, second upper segment 82 can have a third length 87, and second lower segment 84 can have a fourth length 88. In some embodiments, the combined length of the first and second lengths 85, 86 can be substantially equal to the combined length of the third and fourth lengths 87, 88 (i.e., first length+second length=third length+fourth length). It will be appreciated that first expansion component 14 and/or third expansion component 38 can have similar proportions.

Referring back to FIG. 1, the arrangement and other features of expansion components 12 within support member 10 will be explained in greater detail according to exemplary embodiments. As stated, expansion components 12 can be arranged in a row that extends generally along the first axis 21. More specifically, the row can begin at first peripheral edge 13 and end at second peripheral edge 15. First peripheral edge 13 can be formed by a first strip member 52 of a first end expansion component 50. Second peripheral edge 15 can be formed by a second strip member 56 of a second end expansion component 54.

Also, one or more of the plurality of expansion components 12 can be offset relative to each other along the second axis 23. This can cause third peripheral edge 17 and/or fourth peripheral edge 19 to be uneven (e.g., staggered, stepped, wavy, etc.)

Additionally, in some embodiments, the end junctions of support member 10 can be offset along the second axis 23. For example, first end junctions 20, 32, 44 can be offset relative to each other along the second axis 23. Thus, in embodiments in which first end junctions 20, 32, 44 cooperate to form third peripheral edge 17, third peripheral edge 17 can be stepped as shown in FIG. 1. Likewise, second end junctions 22, 34, 46 can be offset relative to each other along the second axis 23. Thus, in embodiments in which second end junctions 22, 34, 46 cooperate to form fourth peripheral edge 19, fourth peripheral edge 19 can be stepped as shown in FIG. 1.

Moreover, the plurality of intermediate junctions 35 can be offset relative to each other along the second axis 23. Additionally, the individual lengths of expansion components 12 within support member 10 can differ. For example, the first expansion component 22 can have a first length measured from first end junction 20 to second end junction 22 along second axis 23, and the second expansion component 26 can have a second length measured from first end junction 32 to second end junction 34. As shown in FIG. 1, the first length of first expansion component 22 can be greater than the second length of second expansion component 26. Furthermore, the lengths of other expansion components 12 can differ.

It will be appreciated that support member 10 can include a different configuration of support members 12 without departing from the scope of the present disclosure. For example, support members 12 can be shaped differently from those illustrated. Also, external openings 31, internal openings 33, and/or outer periphery 11 can be non-linear in some embodiments. Also, expansion components 12 can be arranged in a row as shown in FIGS. 1-3. In additional embodiments, support member 10 can include a plurality of rows of expansion components 12. The rows can be attached, and the rows can each extend along the first axis 21 in some embodiments. Also, in some embodiments, at least some of the expansion components 12 within different rows can be arranged in different columns.

As shown in the embodiment of FIG. 2, when support member 10 is in the contracted position, at least some of the external openings 31 can be arranged as slits (i.e., external slits). In some embodiments, at least some of the external openings 31 can be straight, linear and substantially parallel to the second axis 23. Also, in some embodiments, two or more external openings 31 can be substantially aligned. For example, pairs of the external openings 31 that are separated by the intermediate junctions 35 can be substantially aligned. Specifically, in some embodiments, first external opening 68 and third external opening 74 can be substantially aligned as shown in FIG. 2. Likewise, in some embodiments, second external opening 70 and fourth external opening 76 can be substantially aligned. Other pairs of external openings 31 can be similarly aligned as shown in FIG. 1. Additionally, two or more external openings 31 can have different lengths from each other.

Also, at least some of the internal openings 33 can be arranged as slits (i.e., internal slits) when support member 10 is in the contracted position as represented in FIGS. 1 and 2. In some embodiments, at least some of the internal openings 33 can be straight, linear, and substantially parallel to the second axis 23. Additionally, two or more internal openings 33 can have different lengths from each other.

Additionally, when in the contracted position, expansion components 12 can be rectangular and elongate. Thus, for example, first upper segment 78 and first lower segment 80 of second expansion component 26 can be substantially straight and aligned when in the contracted position. Likewise, second upper segment 82 and second lower segment 84 can be substantially straight and aligned when in the contracted position. The first expansion component 14, third expansion components 38, and/or other expansion components 12 can be similarly configured.

Referring now to FIGS. 2 and 3, expansion of the support member 10 will now be discussed in more detail according to exemplary embodiments. As discussed above, support member 10 can include a plurality of openings (e.g., the internal openings 33 and the external openings 31) that divide support member 10 into multiple sub-components. Also, these sub-components can be joined at predetermined areas. These junctions can operate substantially as pivot-points or hinges in some embodiments, such that the sub-components can rotate about the junction when support member 10 moves between the contracted position and the expanded position.

To move support member 10 away from the contracted position to second position, first peripheral edge 13 and second peripheral edge 15 can be moved away from each other. During this movement, at least some of the external openings 31 can open up (i.e., the area of the opening 31 can increase) to move the expansion components 12 away from each other. Also, as support member 10 expands, one or more internal openings 33 can open up (i.e., the area of the opening 33 can increase). Accordingly, one or more expansion components 12 can form a substantially quadrilateral shape in the expanded position. Specifically, first upper segment 78, first lower segment 80, second upper segment 82, and second lower segment 84 can cooperate to form a substantially quadrilateral shape (e.g., an empty diamond-like shape) in the expanded position. The other expansion components 12 can be similarly configured when in the expanded position as shown in FIG. 3. As shown in FIG. 3, the expansion components 12 can be offset along the second axis 23 once support member 10 is in expanded position.

To move support member 10 from the expanded position to the contracted position, the first peripheral edge 13 and second peripheral edge 15 can be moved toward each other, generally along first axis 21. As support member 10 moves, the external openings 31 and the internal openings 33 can close (i.e., the area of the openings 31 can reduce), and each can regain its slit-like configuration. Thus, the expansion components 12 can regain their elongate, rectangular configuration in some embodiments.

Figure 6:
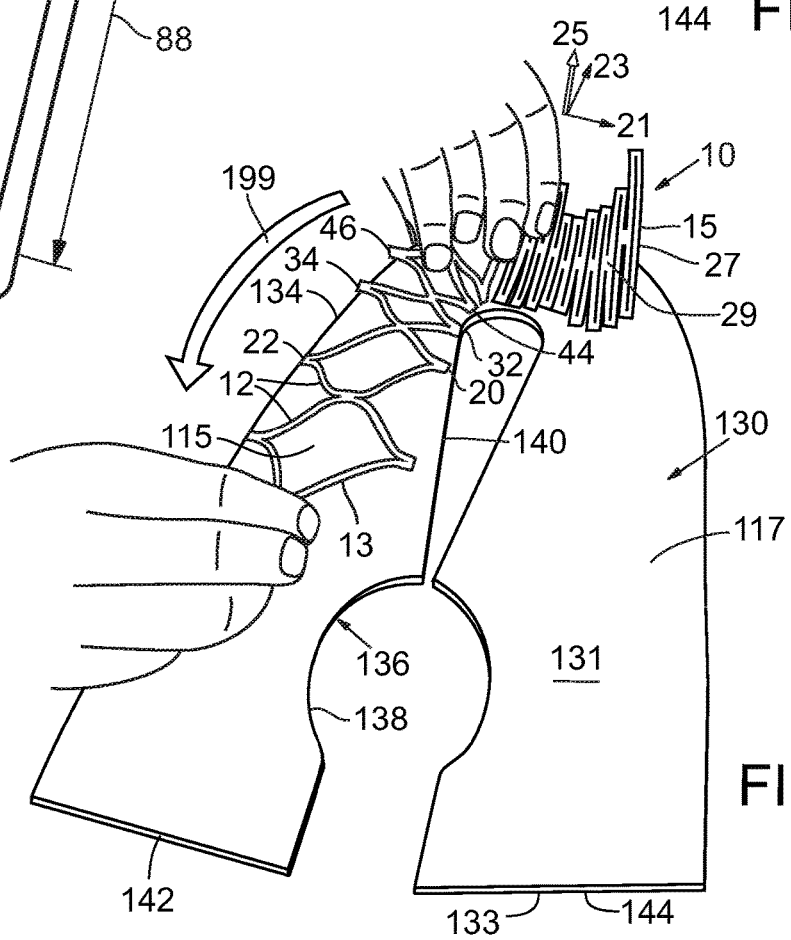
FIG. 6 is a perspective view of the expandable support member of FIG. 5 shown in the process of being expanded relative to the substrate.

In some embodiments, the arrangement and shape of expansion components 12, external openings 31, internal openings 33, and intermediate junctions 35 can provide support member 10 with a high degree of expandability. For example, as noted above, support member 10 can increase in length along the first axis 21. Also, in some embodiments represented in FIG. 6, support member 10 can expand along a curved path. Specifically, in the embodiment illustrated, support member 10 can expand and curve about the third axis 25 when the support member 10 moves from the contracted position toward the expanded position. This expansion along this non-linear expansion direction is indicated in FIG. 6 with curved arrow 199.

These characteristics will be discussed in greater detail with reference to FIGS. 5-11 in which a method of assembling an upper 120 and an article of footwear 100 is illustrated according to exemplary embodiments. As shown in FIGS. 8 and 9, the upper 120 can be formed to include the support member 10, a substrate 130, a lacing element 146, and a shoelace 148. However, it will be appreciated that upper 120 can include different elements and/or upper 120 can be configured differently without departing from the scope of the present disclosure.

Substrate 130 will be discussed according to exemplary embodiments. Substrate 130 is shown flattened, in a plan view in FIGS. 5-7, and substrate 130 is shown assembled to have more three-dimensional shape in FIGS. 8-11.

In some embodiments, substrate 130 can include a front surface 131 and an opposite back surface 133. Also, substrate 130 can include a periphery 132, which can include a generally U-shaped outer peripheral edge 134. The periphery 132 can also include an inner peripheral edge 136, which is spaced apart from and opposite the outer peripheral edge 134. Moreover, the periphery 132 can include a first heel edge 142, which can extend from the outer peripheral edge 134 to the inner peripheral edge 136 proximate a lateral side 115 of the substrate 130. Additionally, the periphery 132 can include a second heel edge 144, which can extend from the outer peripheral edge 134 to the inner peripheral edge 136 proximate a medial side 117 of the substrate 130. As shown in the illustrated embodiments, areas of substrate 130 between outer peripheral edge 134 and throat opening 140 can at least partially form a forefoot area 111, a lateral side 115, and a medial side 117 of the upper 120. Lateral side 115 and medial side 117 of substrate 130 can form portions of a midfoot region 112 of the upper 120. Furthermore, portions of substrate 130 that are proximate first heel edge 142 and second heel edge 144 can form a heel region 114 of upper 120.

Additionally, in some embodiments, substrate 130 can be a textile element or other flexible and/or stretchy element. For example, in some embodiments, substrate 130 can be a single piece of knit textile, which is formed of unitary knit construction. Also, substrate 130 can include features and teachings disclosed in U.S. Pat. No. 8,196,317, issued Jun. 12, 2012 to Dua et al., and/or U.S. Pat. No. 8,490,299, issued Jul. 23, 2013 to Dua et al., the entire disclosures of each being incorporated herein by reference.

In some embodiments, the substrate 130 can be a relatively lightweight, stretchable or otherwise flexible member. In some embodiments, support member 10 can be attached to substrate 130 to provide stretch resistance to the substrate 130. Support member 10 can be included for other reasons as well. For example, support member 10 can be included for reinforcing substrate 130 to make the upper 120 more durable.

Support member 10 can be layered over and attached to a surface of substrate 130 in some embodiments. For example, support member 10 can be attached to the front surface 131 of the substrate 130. Thus, support member 10 can be exposed on an exterior of the upper 120. In other embodiments, support member 10 can be included on the back surface 133 of substrate 130 to be inside upper 120. Furthermore, in some embodiments, upper 120 can be constructed from a plurality of members, and support member can be at least partially layered between the members.

Figure 5:
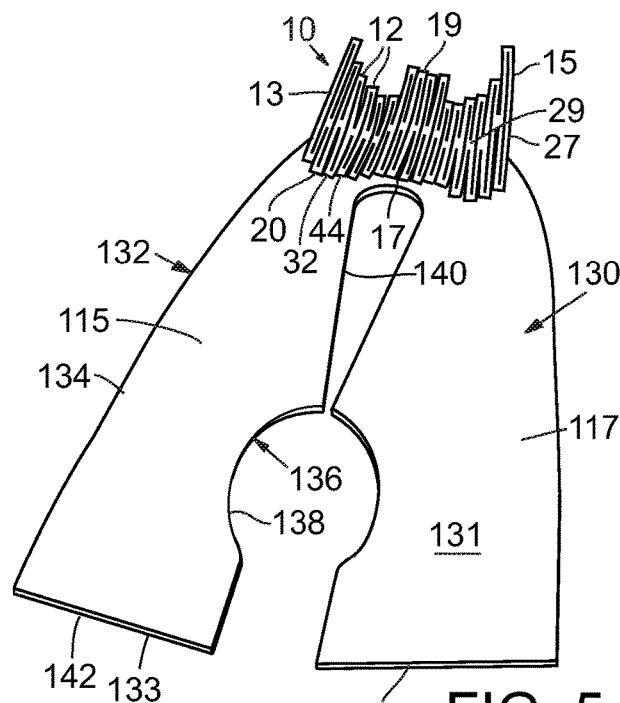
FIG. 5 is a perspective view of the expandable support member of FIG. 1 positioned relative to a substrate of an article of footwear.

As shown in FIG. 5, during assembly of the upper 120, support member 10 can be positioned in forefoot region 111 of substrate 130. In the embodiment illustrated, for example, support member 10 can be layered over substrate 130 with first surface 27 facing front surface 131 of substrate 130. Then, as shown in FIG. 6, support member 10 can be expanded. For example, the first edge 13 can be pulled, causing the expansion components 12 to expand. More specifically, support member 10 can be expanded along a curved path from forefoot region 111 along lateral side 115 of substrate 130. More specifically, as shown in FIG. 6, the support member 10 can expand along a curved path, which rotates about the third axis 25 (i.e., the axis extending through the thickness of the support member 10). Similarly, the second edge 15 can be pulled along an opposite curved path to expand the expansion components 12 along the lateral side 117 of substrate 130.

Figure 7:
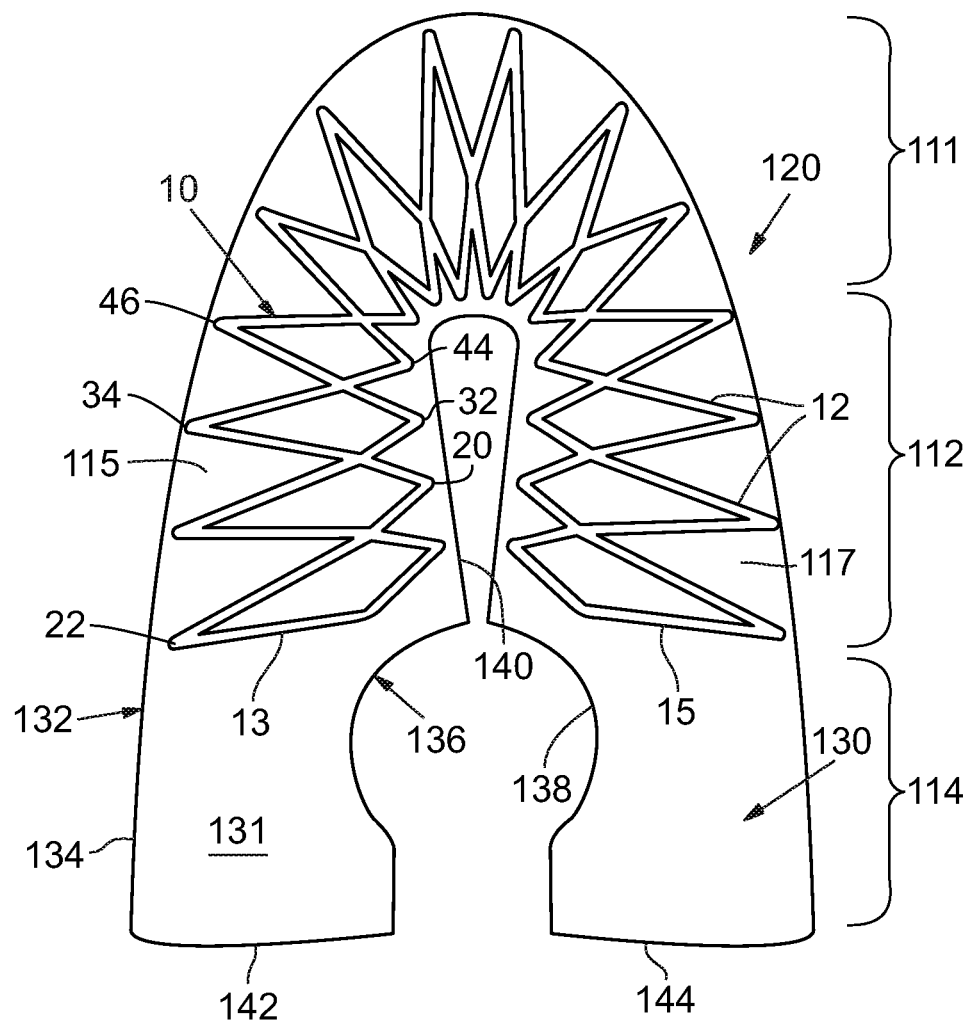
FIG. 7 is a plan view of the support member and substrate of FIG. 6, wherein the support member is in the expanded position and attached to the substrate according to exemplary embodiments.

Accordingly, the row of expansion components 12 can extend from the medial side 117 of substrate 130, across the forefoot region 111, to the lateral side 115 as shown in FIG. 7. Also, in some embodiments, the first end junctions (e.g., first end junctions 20, 32, 44) of support member 10 can be disposed proximate throat opening 140, and the second end junctions (e.g., second end junctions 22, 34, 46) of support member 10 can be disposed proximate the outer peripheral edge 134.

Support member 10 can be attached to substrate 130 while in the expanded position. Support member 10 can be attached using adhesives, fasteners, sewing, or other implements.

The flexibility and expandability of support member 10 can allow support member 10 to layer smoothly across substrate 130. For example, in some embodiments, first surface 27 of support member 10 can layer smoothly across substrate 130.

Then, as shown in FIG. 8, first heel edge 142 and second heel edge 144 can be joined at a seam 145 as illustrated in FIG. 8. Also, lacing element 146 can be attached at a throat 150 of upper 120. In some embodiments, lacing element 146 can be attached to cover over at least some of the first end junctions 20, 32, 44 of the support member 10.

Furthermore, in some embodiments, sole structure 110 can be attached as shown in FIG. 8. In some embodiments, sole structure 110 can be attached to cover over outer peripheral edge 134 of substrate 130. Also, in some embodiments, sole structure 110 can be attached to cover at least some of the second end junctions 22, 34, 46 of support member 10.

Therefore, as shown in FIGS. 9-11, upper 120 can include support member 10, and support member 10 can span like a web across forefoot region 111, lateral side 115, and medial side 117 of upper 120. Support member 10 can support substrate 130 and resist stretching in some embodiments. In additional embodiments, support member 10 can protect substrate 130 and/or reinforce substrate 130. Support member 10 can also conform to the wearer's foot and/or maintain the foot over the sole structure 110.

Additionally, in some embodiments, the expansion components 12 can be oriented in a way such that the expansion components 12 transfer and/or distribute forces across the upper 120 in a predetermined manner. For example, expansion components 12 can be oriented to extend along predetermined load paths within upper 120. Accordingly, support member 10 can provide needed support to upper 120 and/or the wearer's foot.

Although the illustrated embodiments of upper 120 include support member 10 shown extending from lateral side 115, across forefoot region 111, to medial side 117, it will be appreciated that support member 10 can extend across other portions of upper 120 without departing from the scope of the present disclosure. For example, in some embodiments, support member 10 can extend from lateral side 115, across heel region 114, to medial side 117. In additional embodiments, support member 10 can extend substantially about the entire upper, from lateral side 115, across forefoot region 111, to medial side 117, to heel region 114, and back to lateral side 115.

Also, while upper 120 is shown with support member 10 attached to substrate 130, it will be appreciated that upper 120 may not include the substrate 130. For example, in some embodiments, support member 10 can independently define the majority of upper 120, leaving the wearer's foot exposed through the external openings 31 and/or the internal openings 33.

Figure 12:
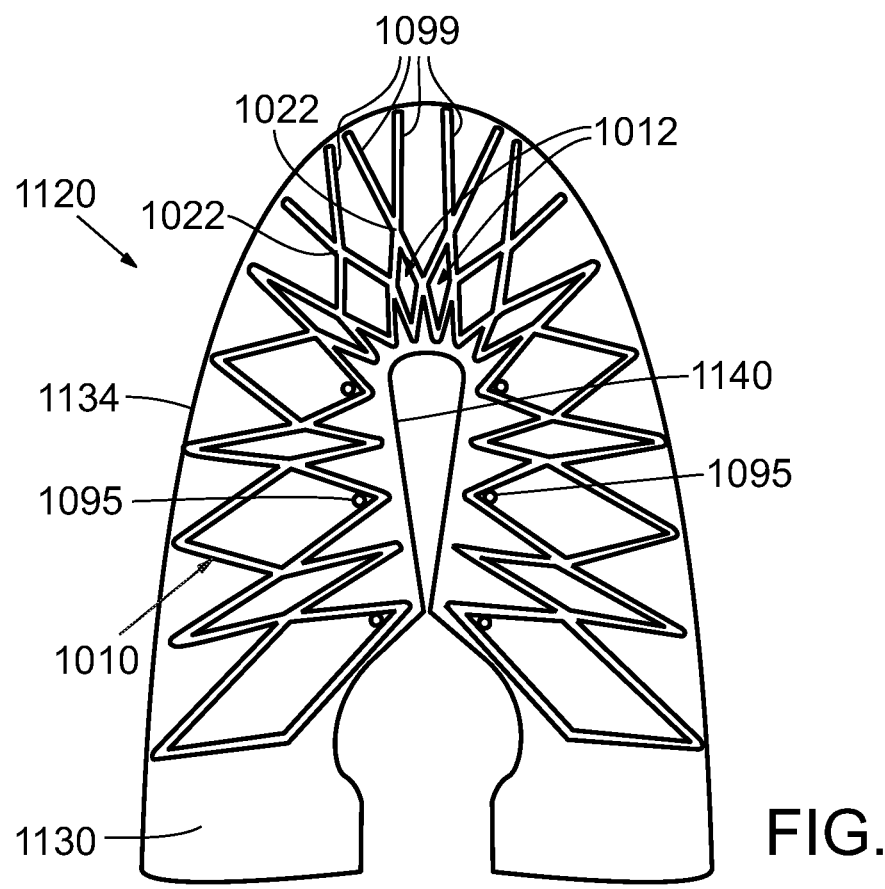
FIG. 12 is a plan view of an upper with an expandable support member according to additional exemplary embodiments.

Referring now to FIG. 12, upper 1120 is illustrated according to additional embodiments. Upper 1120 can include support member 1010, which can correspond to support member 10 of FIGS. 1-11 except as noted. Features that correspond to the embodiments of FIGS. 1-11 are indicated with corresponding reference numbers increased by 1000.

As shown, support member 1010 can include a plurality of expansion components 1012. The plurality of expansion components 1012 are shown in the expanded position. Expansion components 1012 can be shaped and arranged differently from the embodiments of FIGS. 1-11 such that expansion components 1012 are laid out differently across substrate 1130.

Furthermore, as shown, support member 1010 can include one or more extended ends 1099. In some embodiments, the extended ends 1099 can be elongate and can extend from one of the end junctions 1022 of the expansion components 1012. More specifically, in the embodiment illustrated, the extended ends 1099 can extend from the second end junctions 1022 of the respective expansion components 1012 to extend to the outer peripheral edge 1134.

Also, in some embodiments, one or more expansion components 1012 can encompass a lacing element 1095 of the substrate 1130. In some embodiments, lacing element 1095 can be an eyelet for a shoelace; however, it will be appreciated that the lacing element 1095 can include a hook, a buckle, or other related structure. As shown, the expansion components 1012 can at least partially encompass the lacing element 1095 to reinforce the lacing element 1095 and/or transfer forces from the lacing element 1095 to other areas of the upper.

Figure 13:
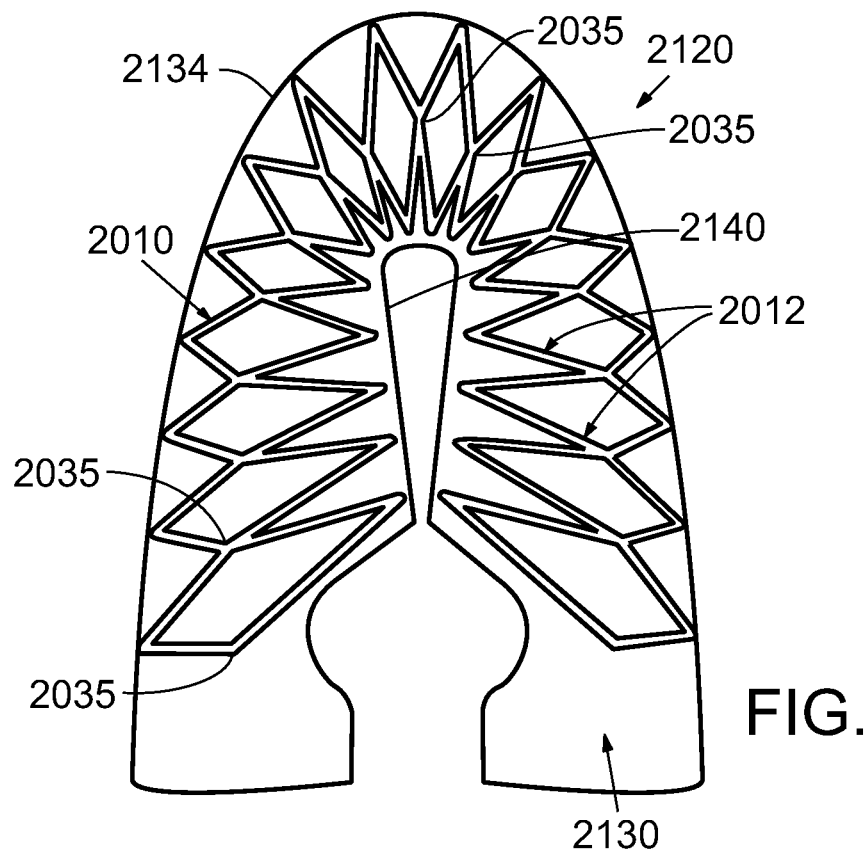
FIG. 13 is a plan view of an upper with an expandable support member according to additional exemplary embodiments.

Referring now to FIG. 13, additional embodiments of support member 2010 are illustrated. Upper 2120 can include support member 2010, which can correspond to support member 10 of FIGS. 1-11 except as noted. Features that correspond to the embodiments of FIGS. 1-11 are indicated with corresponding reference numbers increased by 2000.

As shown, the intermediate junctions 2035 are disposed closer to outer peripheral edge 2134 than in the embodiments of FIGS. 1-11. As a result, support member 2010 can extend across different portions of upper 2120 as compared to the embodiments of FIGS. 1-11. Thus, support member 2010 can distribute forces differently from the embodiments of FIG. 1-11.

Figure 14:
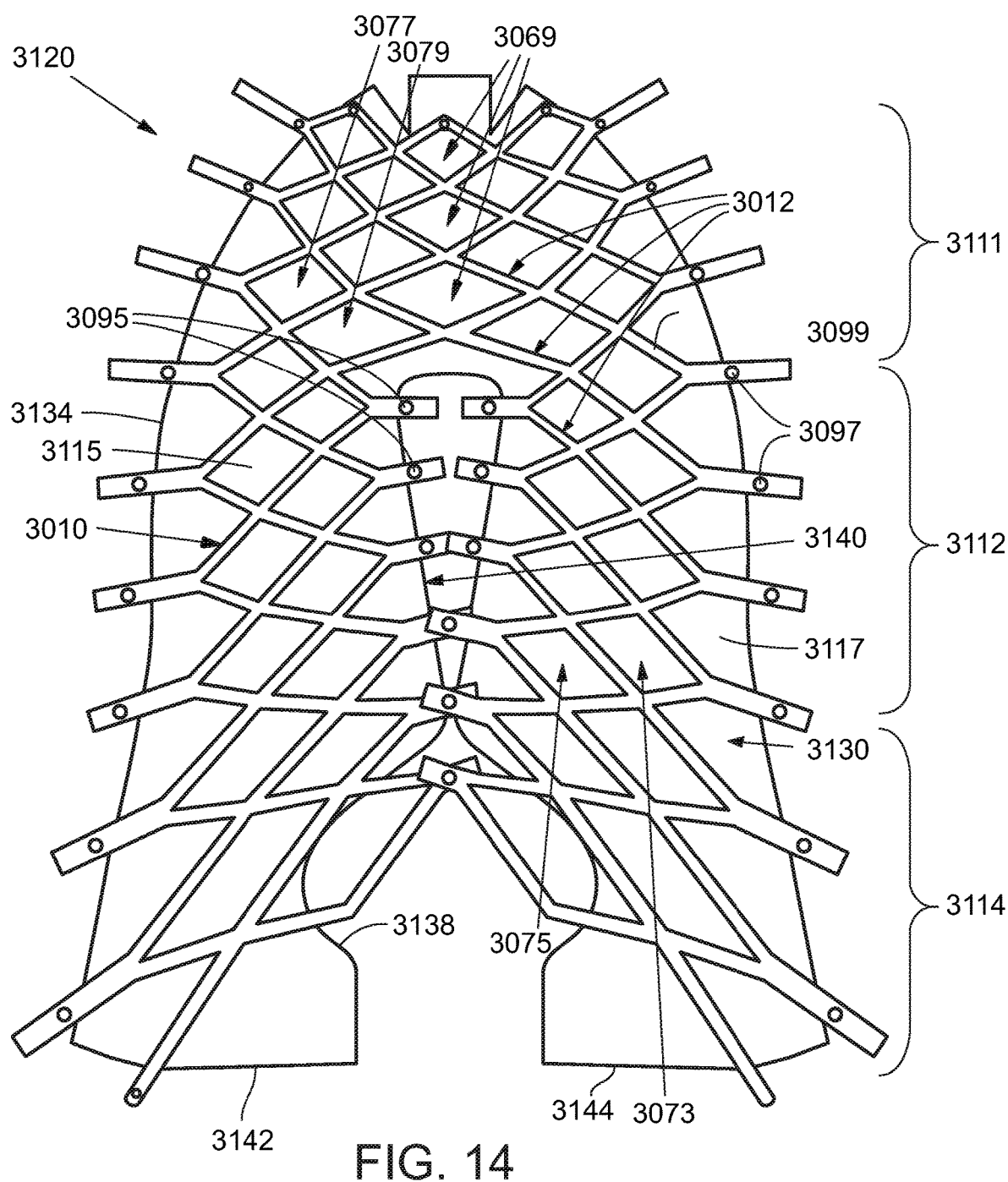
FIG. 14 is a plan view of an upper with an expandable support member according to additional exemplary embodiments.

Referring now to FIG. 14, additional embodiments of upper 3120 are illustrated. Upper 3120 can include support member 3010, which can correspond to support member 10 of FIGS. 1-11 except as noted. Features that correspond to the embodiments of FIGS. 1-11 are indicated with corresponding reference numbers increased by 3000.

As shown, support member 3010 can include a plurality of central expansion components 3069. Central expansion components 3069 can be disposed in the forefoot region 3111. Support member 3010 can expand from central expansion components 3069 to lateral side 3115 and medial side 3117.

For example, support member 3010 can include a first lateral row 3077 of expansion components 3012 and a second lateral row 3079 of expansion components 3012. First lateral row 3077 can be disposed closer to outer peripheral edge 3134 than second lateral row 3079. Also, support member 3010 can include a first medial row 3073 of expansion components 3012 and a second medial row 3075 of expansion components 3012. First medial row 3073 can be disposed closer to outer peripheral edge 3134 than second medial row 3075.

Also, as shown, support member 3010 can extend within forefoot region 3111, midfoot region 3112, and heel region 3114 of upper 3120. Specifically, support 3010 can extend substantially from first heel edge 3142, along lateral side 3115, across forefoot region 3111, along medial side 3117, to second heel edge 3144.

Also, in some embodiments, support member 3010 can include one or more apertures that can be used for indexing support member 3010 relative to substrate 3012. For example, support member 3010 can include outer indexing apertures 3097, which are proximate outer peripheral edge 3134. Support member 3010 can also include inner indexing apertures 3095, which are proximate throat opening 3140. In some embodiments, inner and outer indexing apertures 3095, 3097 can be included in extended ends 3099 of support member 3010. In some embodiments, support member 3010 can be pinned or otherwise secured to a body using indexing apertures 3095, 3097 when attaching support member 3010 to substrate 3130. In some embodiments, support member 3010 can be pinned using indexing apertures 3095, 3097 when applying heat (i.e., steam) to the support member 3010 and substrate 3130.

Support member 10 can be formed in a variety of ways. Also, support member 10 can be formed of a variety of materials. In some embodiments, support member 10 can be a unitary, one-piece member. Thus, the plurality of expansion components 12 can be integrally attached to each other.

For example, as shown in FIG. 1, support member 10 can be formed from a textile element. In some embodiments, support member 10 can be a knitted element. Specifically, as shown in FIG. 1, support member 10 can be formed from one or more knitted and interlooped yarns 500. Accordingly, support member 10 can be formed of unitary warp knit construction. As such, support member 10 can be a unitary, one-piece member. Additionally, in some embodiments, external openings 31 and internal openings 33 can be knit-in and formed during the process of knitting support member 10. Thus, the knitting process can be used to form the edges that define the external openings 31 and internal openings 33. Specifically, in some embodiments, support member 10 can include features and can be formed according to Non-provisional Patent Application No. 62/180,984, which is co-filed with the present application, and which is incorporated by reference in its entirety.

As utilized herein, a knitted component (e.g., the textile element forming support member 10) is defined as being formed of "unitary knit construction" when formed as a one-piece element through a knitting process. Additionally, a knitted component is defined as being formed of "unitary warp knit construction" when formed as a one-piece element through a warp knitting process. That is, the knitting process substantially forms the various features and structures of support member 10 without the need for significant additional manufacturing steps or processes. A unitary (warp) knit construction may be used to form a knitted component having structures or elements that include one or more courses of yarn, strands, or other knit material that are joined such that the structures or elements include at least one course or wale in common (i.e., sharing a common yarn), include areas that are interlooped with each other, and/or include areas that are substantially continuous between each of the structures or elements. With this arrangement, a one-piece element of unitary knit construction is provided.

In some embodiments, the knitted structures of support member 10 can be oriented on footwear 100 in a predetermined manner. For example, as shown in FIG. 1, the weft direction of support member 10 can extend between first peripheral edge 13 and second peripheral edge 15 (i.e., substantially parallel to the first axis 21). Also, the warp direction of support member 10 can extend between the third peripheral edge 17 and the fourth peripheral edge 19 (i.e., substantially parallel to the second axis 23). Those having ordinary skill in the art will understand that support member 10 can exhibit a high degree of stretch resistance in the warp direction. Thus, when positioned on the upper 120 as shown in FIGS. 9-11, support member 10 can substantially resist stretching between the sole structure 110 and the throat 150.

Figure 15:
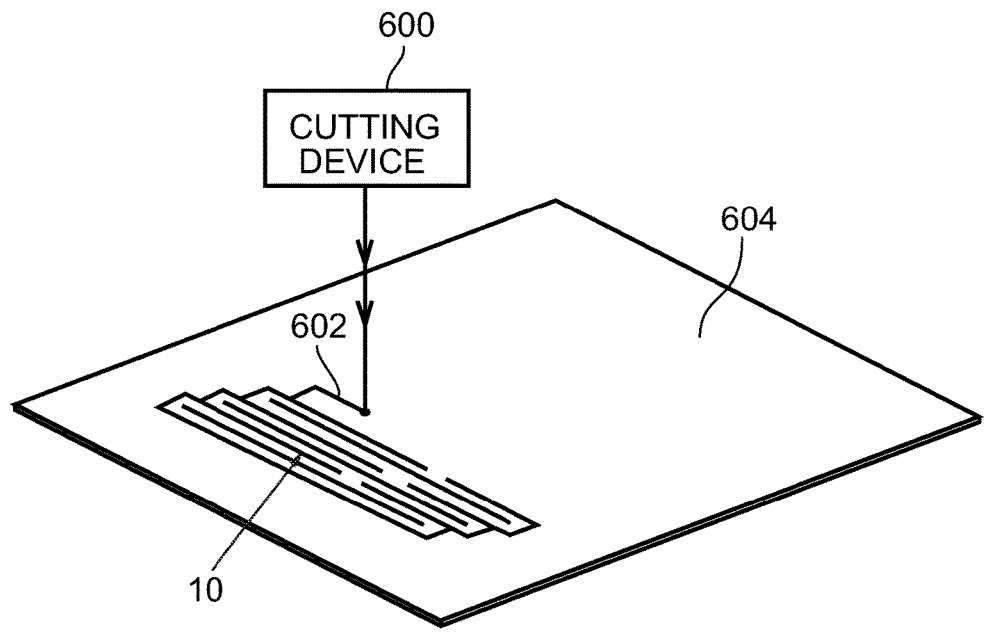
FIG. 15 is a schematic illustration of a method of manufacturing the expandable support member of FIG. 1 according to exemplary embodiments.

In other embodiments represented in FIG. 15, support member 10 can be formed by a cutting device 600. For example, cutting device 600 can be a laser cutting device, a band saw, or other cutting device that can cut support member 10 from a sheet of bulk material 604. Thus, cutting device 600 can cut a plurality of slits 602 in bulk material 604 to form the support member 10 described above. Stated differently, cutting device 600 can form the cut slits 302 that define the internal openings 31 and the external openings 33. Also, in some embodiments, the cutting device 600 can cut the outer periphery 11 of the support member 11.

Figure 16:
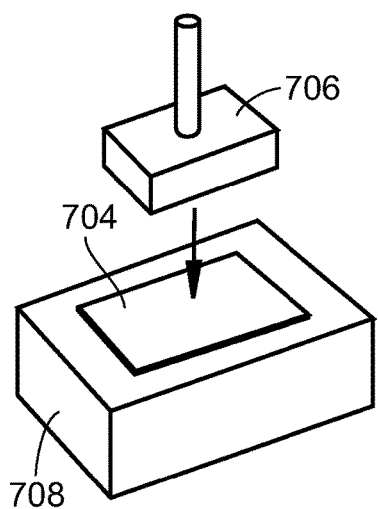
FIGS. 16, 17, and 18 are schematic illustrations of the method of manufacturing the expandable support member of FIG. 1 according to additional exemplary embodiments.
Figure 17:
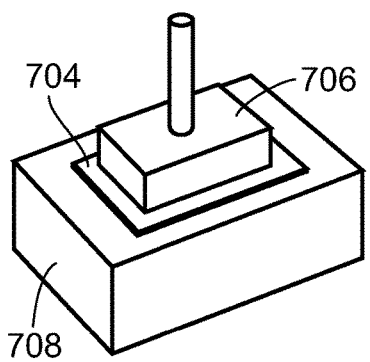
Figure 18:
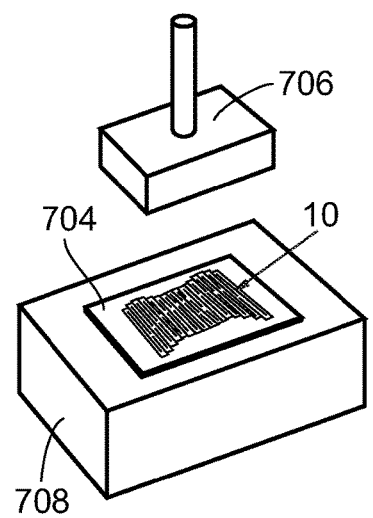

In still other embodiments represented in FIGS. 16-18, support member 10 can be formed by a cutting die 706. Cutting die 706 can be supported for reciprocal movement relative to a support 708. Bulk material 704 can be provided between support 708 and cutting die 706. Then, as shown in FIG. 17, die 706 can be pressed against bulk material 704. Thus, as shown in FIG. 18, die 706 can cut support member 10 from bulk material 704.

Figure 19:
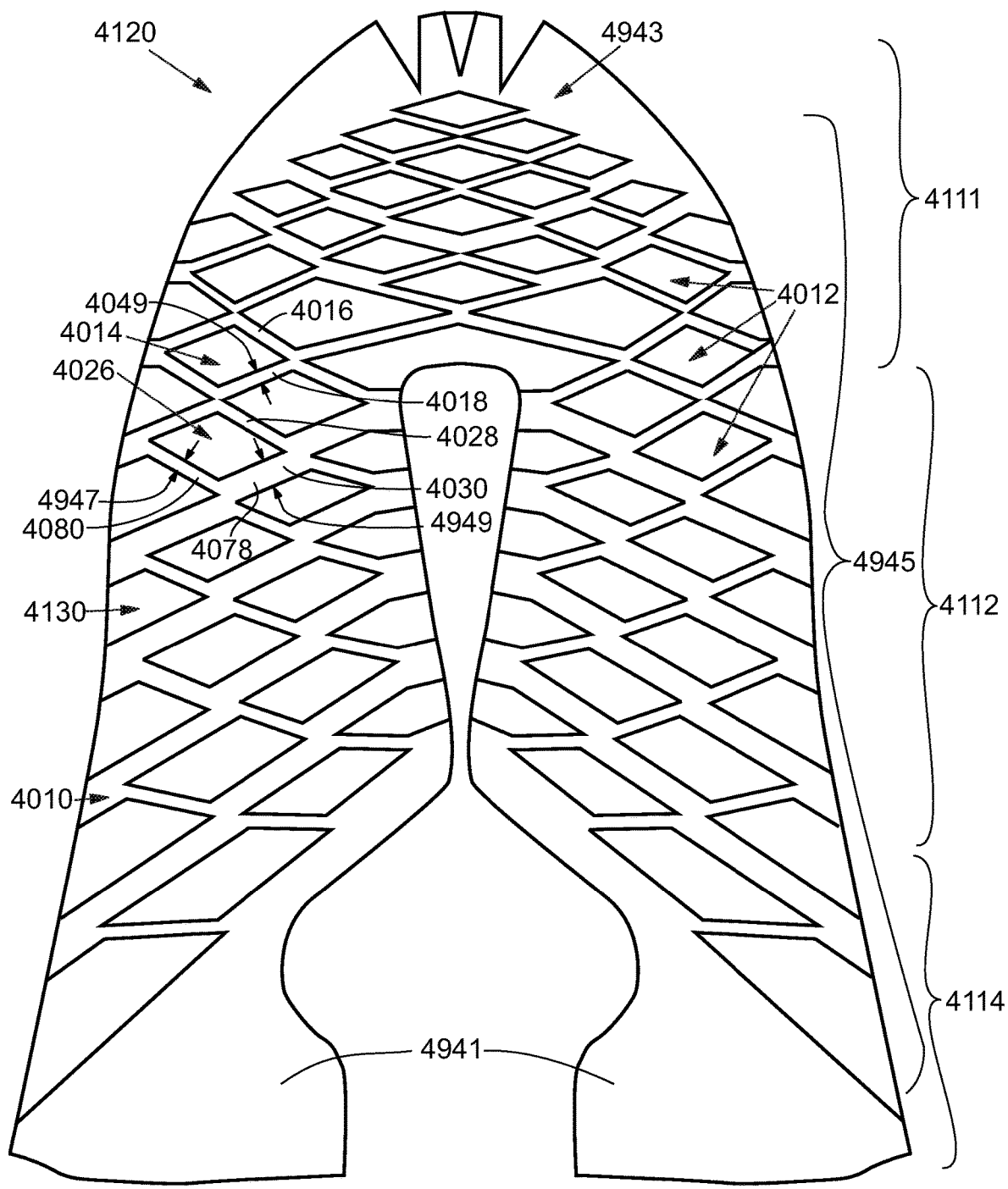
FIG. 19 is a plan view of an upper with an expandable support member according to additional exemplary embodiments.

Referring now to FIG. 19, additional embodiments of upper 4120 are illustrated. Upper 4120 can include support member 4010, which can correspond to support member 10 of FIGS. 1-11 except as noted. Features that correspond to the embodiments of FIGS. 1-11 are indicated with corresponding reference numbers increased by 4000.

As shown, support member 4010 can include a plurality of expansion components 4012. Expansion components 4012 are shown in the expanded position in FIG. 19 such that the internal openings are expanded from slits to diamond-shape openings. Also, support member 4010 is shown attached to the substrate 4130.

As shown in the illustrated embodiment, the plurality of expansion components 4012 can include a first expansion component 4014 and a second expansion component 4026. First expansion component 4014 and second expansion component 4026 are indicated as examples, and it will be appreciated that other expansion components 4012 can include similar features.

First expansion component 4014 can include first strip member 4016 and second strip member 4018, which cooperate to form a diamond-like shape in the expanded position. Also, second expansion component 4026 can include first strip member 4028 and second strip member 4030, which cooperate to form a diamond-like shape in the expanded position.

In some embodiments, different strip members can have different widths. For example, as shown in FIG. 19, strip member 4018 can have a first width 4049, and strip member 4030 can have a second width 4949. Second width 4949 can be greater than the first width 4049.

Also, in some embodiments, the width of a single strip member can vary along its length. For example, as shown in the embodiment of FIG. 19, the strip member 4030 can include a first segment 4078 and a second segment 4080. The first segment 4078 can have the second width 4949, and the second segment 4080 can have a third width 4947. The second width 4949 can be greater than the third width 4947.

In some embodiments, areas of the upper 4120 that are subject to particularly high loading can include wider strip members while other areas of the upper 4120 can include narrower strip members. Also, in some embodiments, areas of the upper 4120 allowing for increased airflow, breathability, and exposure of the foot can include narrower strip members while other areas of the upper 4120 providing greater coverage of the foot can include wider strip members.

Moreover, in some embodiments, the support member 4010 can include an expansion region 4945 and at least one continuous region 4941, 4943. Generally, the expansion region 4945 can include a number of the plurality of expansion components 4012, and the expansion components 4012 can be absent from the continuous region(s) 4941, 4943. As such, the expansion region 4945 can exhibit a high degree of expandability as compared to the continuous region(s) 4941, 4943. The support member 4010 can include any number of expansion regions 4945 and any number of continuous regions 4941, 4943 without departing from the scope of the present disclosure. For example, as shown in the embodiment of FIG. 19, the support member 4010 can include a single expansion region 4945, which extends through the midfoot region 4112 and partially within the forefoot region 4111 and heel region 4114. The support member 4010 can also include a heel continuous region 4941, which extends through the heel region 4114. Additionally, the support member 4010 can include a forefoot continuous region 4943, which extends through the forefoot region 4111.

In some embodiments, the expansion region 4945 can provide support to the upper 4120 as discussed above. Also, the continuous regions 4941, 4943 can provide greater durability and abrasion resistance for the upper 4120.

While various embodiments of the present disclosure have been described, the description is intended to be exemplary, rather than limiting and it will be apparent to those of ordinary skill in the art that many more embodiments and implementations are possible that are within the scope of the present disclosure. Accordingly, the present disclosure is not to be restricted except in light of the attached claims and their equivalents. Also, various modifications and changes may be made within the scope of the attached claims. Moreover, as used in the claims "any of" when referencing the previous claims is intended to mean (i) any one claim, or (ii) any combination of two or more claims referenced.

I claim:

1. A method of forming an article of footwear comprising:
    providing a support member in an unexpanded state, the unexpanded support member having a first width;
    forming a plurality of internal slits in the unexpanded support member to provide a plurality of expansion component including at least a first expansion component, a second expansion component, and a third expansion component, the plurality of internal slits comprising:
        a first internal slit that extends between a first strip member and a second strip member of the first expansion component, the first strip member and the second strip member of the first expansion component being joined at a first end junction;
        a second internal slit that extends between a first strip member and a second strip member of a second expansion component, the first strip member and the second strip member of the second expansion component being joined at a second end junction; and
        a third internal slit that extends between a first strip member and a second strip member of a third expansion component, the first strip member and the second strip member of the third expansion component being joined at a third end junction;
    forming a plurality of external slits in the unexpanded support member, the plurality of external slits comprising a first external slit separating the first and second expansion components and a second external slit separating the second and third expansion components;
    expanding the support member from the unexpanded state to an expanded state generally along a direction of the first width to increase an area of the plurality of internal slits and an area the plurality of external slits, the expanded support member having a second width that is greater than the first width;
    incorporating the support member in an upper for the article of footwear when the support member is in the expanded state; and
    attaching a sole structure to a lower area of the upper.

2. The method of claim 1, wherein the plurality of expansion component are arranged in a row generally along the direction of the first width, and
    wherein the first end junction, the second end junction, and the third end junction are offset from each other in a transverse direction, the transverse direction being transverse to the direction of the first width.

3. The method of claim 1, wherein the first end junction, the second end junction, and the third end junction have a staggered arrangement and define an uneven peripheral edge of the support member in the unexpanded state.

4. The method of claim 3, wherein the first external slit extends from a first intermediate junction to the peripheral edge, the first external slit being open at the peripheral edge, and wherein the second external slit extends from a second intermediate junction to the peripheral edge, the second external slit being open at the peripheral edge.

5. The method of claim 1, wherein the forming of the plurality of internal slits and the forming of the plurality of external slits comprise cutting the support member with a cutting device.

6. The method of claim 1, wherein the forming of the plurality of internal slits and the forming of the plurality of external slits comprise cutting the support member with a laser cutting device.

7. The method of claim 1, wherein the forming of the plurality of internal slits and the forming of the plurality of external slits comprise cutting the support member with a cutting die.

8. The method of claim 1, wherein the support member is textile element.

9. The method of claim 8, further comprising:

forming the textile element by knitting the plurality of expansion components, wherein the first expansion component, the second expansion component, and the third expansion component are formed of a unitary knit construction.

10. The method of claim 9, wherein knitting the plurality of expansion components includes:

knitting a first internal edge of the first strip members; and
knitting a second internal edge of the second strip members, the first and second internal edges cooperating to define respective ones of the plurality of internal slits.

11. The method of claim 9, wherein knitting the plurality of expansion components includes warp knitting the plurality of expansion components, and wherein the first expansion component, the second expansion component, and the third expansion component are formed of a unitary warp knit construction.

12. The method of claim 1, wherein incorporating the support member includes overlaying the expanded support member on a substrate member of the upper; and attaching the expanded support member on the substrate member.

13. The method of claim 1, wherein incorporating the support member includes extending the row of the plurality of expansion components across at least portion of a medial side of the upper.

14. The method of claim 1, wherein incorporating the support member includes extending the row of the plurality of expansion components across at least portion of a medial side of the upper, across at least a portion of a forefoot region of the upper, and across at least a portion of a lateral side of the upper.

15. The method of claim 1, wherein the first, second, and third end junctions of the are upper end junctions; and the first strip member and the second strip member of the first expansion component being joined at a fourth end junction, the fourth end junction being opposite that of the first end junction;

the first strip member and the second strip member of the second expansion component being joined at a fifth end junction, the fifth end junction being opposite that of the second end junction; and the first strip member and the second strip member of the third expansion component being joined at a sixth end junction, the sixth end junction being opposite that of the third end junction.

16. The method of claim 15, wherein incorporating the support member in the upper further comprises:

disposing at least one of the first, second, or third end junctions proximate a throat of the upper; and disposing at least one of the fourth, fifth, and sixth end junctions proximate the lower area of the upper.

* * * * *

UNITED STATES PATENT AND TRADEMARK OFFICE
CERTIFICATE OF CORRECTION

PATENT NO. : 10,856,617 B2
APPLICATION NO. : 16/271698
DATED : December 8, 2020
INVENTOR(S) : Scott C. Holt Page 1 of 1

It is certified that error appears in the above-identified patent and that said Letters Patent is hereby corrected as shown below:

In the Claims

Column 16, Line 16, Claim 14 "of expansion components across at least portion of a medial" should read --of expansion components across at least a portion of a medial--

Column 16, Line 21, Claim 15 "wherein the first, second, and third end junctions of the are" should read --wherein the first, second, and third end junctions are--

Signed and Sealed this
Second Day of March, 2021

Drew Hirshfeld
*Performing the Functions and Duties of the*
*Under Secretary of Commerce for Intellectual Property and*
*Director of the United States Patent and Trademark Office*